United States Patent [19]

Donermeyer et al.

[11] Patent Number: 4,542,047

[45] Date of Patent: Sep. 17, 1985

[54] PROCESS BONDED REINFORCED PLASTIC STRUCTURES

[75] Inventors: Donald D. Donermeyer, Springfield; Joseph G. Martins, Ludlow; David A. Fabel, Springfield, all of Mass.

[73] Assignee: Monsanto Company, St. Louis, Mo.

[21] Appl. No.: 656,215

[22] Filed: Oct. 1, 1984

Related U.S. Application Data

[62] Division of Ser. No. 464,081, Feb. 4, 1983, Pat. No. 4,482,604.

[51] Int. Cl.$^4$ .......................... B05D 1/36; B05D 3/02; B05D 7/00
[52] U.S. Cl. .................................. 427/374.4; 156/330; 427/386; 427/412.1; 427/412.5
[58] Field of Search ............................. 156/331.8, 330; 427/386, 388.2, 410, 374.4, 412.1, 412.5; 428/336, 414, 430, 474.4, 474.7, 475.2, 477.4, 480

[56] References Cited

U.S. PATENT DOCUMENTS

| | | | |
|---|---|---|---|
| 3,650,999 | 3/1972 | Martins et al. | 260/220 |
| 3,922,468 | 11/1975 | Burke et al. | 428/414 X |
| 3,979,540 | 9/1976 | Moffett | 428/414 X |
| 4,053,682 | 10/1977 | Donermeyer | 428/460 |
| 4,173,290 | 11/1979 | Kobayashi et al. | 220/75 |

OTHER PUBLICATIONS

Derwent Abstract, Japan 56159-257, Ube Industries, Dec., 1981.
Derwent Abstract, Japan 57116-640, Kuraray, Jul., 1982.

*Primary Examiner*—Michael R. Lusignan
*Attorney, Agent, or Firm*—R. Bruce Blance; Linda L. Lewis; William J. Farrington

[57] ABSTRACT

A process for bonding a reinforced plastic structure which comprises coating reinforced plastic parts of sheet molding compounds or bulk molding compound with a primer coat and bonding together with a thermoplastic block copolymer.

9 Claims, No Drawings

PROCESS BONDED REINFORCED PLASTIC STRUCTURES

This is a division of application Ser. No. 464,081, filed Feb. 4, 1983, now U.S. Pat. No. 4,482,604, patented Nov. 13, 1984.

BACKGROUND OF THE INVENTION

The present invention is directed to bonded reinforced plastic structures and more particularly to structures comprising reinforced plastic parts bonded together with a hot melt adhesive block copolymer.

The bonding of reinforced plastics is generally accomplished with reactive multi-component thermoset systems such as peroxide cured unsaturated polyesters, polyol-polyisocyanate systems, and epoxy systems. Such systems require precise metering of the components to obtain uniform performance, they generally include toxic or sensitive compounds which need special precautions in handling, they have a finite open time requiring mating of the parts to be bonded before the systems cure or advance to a nonbonding stage, their rate of cure is affected by the moisture content of the ambient air, they require that the bonded parts be held together mechanically for rather long times until the systems have cured sufficiently to provide a strong bond and they require cleaning or purging of the application equipment to avoid setting of the adhesive in the equipment.

Hot melt adhesives overcome such disadvantages since they are single component or single stream systems, their high molecular weight and chemical composition make them relatively non-toxic, they are not sensitive to shock, they develop bond strength simply by being cooled below their softening point and do not require long periods of mechanical fastening until cure has occurred and finally they do not present a problem caused by premature cure or set in the application equipment. However reinforced plastic structures manufactured from sheet molding compounds or bulk molding compounds are frequently subjected to elevated temperatures such as the temperatures used in paint ovens to cure surface coatings applied to the structures. To allow the bonded structures to survive such heat treatment, we have found that the hot melt adhesive should be a block copolymer comprising from 40 to 80% by weight of crystalline polyester or polyamide segments and from 20 to 60% by weight of amorphous polyamide or polyether segments, the block copolymer having a crystalline melting point above 155° C. and a number average molecular weight in the range of about 8,000 to about 30,000. Additionally we have found that to achieve adequate bond strength, the reinforced plastic parts should be coated with a thin layer of a primer coat comprising an epoxidized novolac resin and a resinous amidopolyamine. The present invention is directed to such bonded structures, to the primed reinforced plastic parts and to the method of bonding the parts by coating them with the primer composition and applying the hot melt adhesive.

The reinforced plastic parts used in the bonded structures of the present invention are prepared from sheet molding compounds or bulk molding compounds. Sheet molding compounds and bulk molding compounds are reinforced resin systems containing about 30 to 40 weight % glass fiber, about 30 to 40 weight % inert filler such as clay, wollastonite or calcium carbonate and about 30 to 40 wt % thermoset resin obtained by peroxide cure of unsaturated ester oligomers such as unsaturated alkyd resins and ethylenically unsaturated monomers such as styrene, vinyl chloride, vinyl acetate, ethyl acrylate or methyl methacrylate.

The primer coating system used in the present invention comprises an epoxidized novolac resin and a resinous amidopolyamine. The epoxidized novolac resin is advantageously obtained by reacting epichlorohydrin with a novolac resin containing on average from 2 to 6 phenolic hydroxyl groups to provide an epoxy functionality of about 2 to about 5. More preferably the novolac contains at least 3 phenolic hydroxyl groups and the epoxy functionality is about 3 to about 5. The resinous amidopolyamine advantageously has an amine equivalent weight in the range of about 40 to about 600 and is the product obtained by condensation of a $C_2$ to $C_{10}$ primary polyamine optionally containing secondary amine groups and a fatty dicarboxylic acid containing at least 6 carbon atoms. Suitable polyamines include ethylene diamine, diethylene triamine, triethylene tetramine, and hexamethylene diamine. Preferably the dicarboxylic acid is dimer acid containing from 75 to 98 weight percent dimer and 25 to 2 weight percent trimer and the polyamine is diethylene triamine or triethylene tetramine, and the amine equivalent weight of the amido polyamine is in the range of 100 to 400. The weight ratio of epoxidized novolac resin to resinous amidopolyamine is advantageously in the range of 2:1 to 1:2.

In addition to the epoxidized novolac resin and the resinous amidopolyamine, the primer coating composition may contain an aromatic $C_6$ to $C_{20}$ primary polyamine such as phenylenediamine, a tolylenediamine, a xylenediamine, a naphthylenediamine or a bridged dianiline such as 4,4'-methylene dianiline as a replacement for up to about 70 weight percent of the resinous amidopolyamine in the primer coating composition and may also contain a catalytic amount of a tertiary amine such as triethylene diamine, dimethylaminoethylphenol or diethylaminomethylphenol.

Prior to application of the primer coating, the reinforced plastic parts are advantageously cleaned with a low boiling hydrocarbon or chlorinated hydrocarbon to remove surface contaminants. The primer coating composition, as a dilute solution in hydrocarbon or chlorinated hydrocarbon solvent, is then wiped, brushed or sprayed on the reinforced plastic parts and allowed to dry preferably at room temperature to provide a thin continuous coating of dry primer preferably in a thickness range of about 5 to about 25 microns. The resin concentration of the primer solution is generally in the range of about 2 to about 20 weight percent, and is preferably in the range of about 3 to about 10 weight percent. Indeed the application of such dilute solutions to the reinforced plastic parts by wiping can combine the removal of surface contaminants and the deposition of primer in one step. Depending upon the storage temperature, the primed parts may be stored for several days before they are bonded with molten thermoplastic. However, bonding is most conveniently effected within a few minutes after application of the primer coating.

The hot melt adhesive used for bonding the reinforced plastic parts to provide bonds resistant to subsequent heat exposure is a block copolymer comprising from 40 to 80 weight percent of crystalline polyester or polyamide segments and from 20 to 60 weight percent amorphous polyamide or polyether segments, the block copolymer having a crystalline melting point above about 155° C., preferably in the range of from 180° to 225° C. and a number average molecular weight in the range of about 8,000 to about 30,000. The glass transition temperature of the block copolymer, associated with the amorphous segments is generally less than 50° C., preferably in the range of about −50° to 40° C.

The crystalline polyester or polyamide incorporated into the block copolymer to provide the crystalline segments, advantageously has a number average molecular weight in the range of about 1000 to about 24000, preferably about 1000 to about 6000, and a crystalline melting point of at least about 180° C. Preferably the melting point is in the range of from 200° to 270° C. These hard crystalline segments contribute tensile strength, toughness and high temperature performance to the block copolymer.

The crystalline polyester is a condensate of at least one aliphatic or alicyclic diol having from 2 to 10 carbon atoms and at least one aromatic dicarboxylic acid having from 8 to 20 carbon atoms, the diol and diacids being selected to provide polyesters in the desired melting point range. Representative diols include ethylene glycol, tetramethylene glycol, 1,4-cyclohexane diol and 1,4-cyclohexane dimethanol. Representative diacids include terephthalic acid, isophthalic acid and 2,6-, 2,7-, 2,8-, 1,4- and 1,5-naphthalene dicarboxylic acids. The preferred crystalline polyester is polyethylene terephthalate.

When the hard polyester segments comprise polyethylene terephthalate, a suitable molecular weight range of the polyester prior to condensation with the polyamide segments, corresponds to an inherent viscosity range of about 0.05 to about 0.7 dl g$^{-1}$ determined at 25° C. with a solution of 0.5 g/100 ml in a solvent pair consisting of phenol and sym-tetrachloroethane in the weight ratio of 60:40. Preferably the inherent viscosity is in the range of about 0.1 to about 0.3.

The hard or crystalline polyamide segments of the block copolymer can be condensed from at least one aliphatic or alicyclic diamine having from 2 to 12 carbon atoms and at least one aliphatic or alicyclic dicarboxylic acid having from 2 to 12 carbon atoms selected to provide a polyamide with a melting point in the desired range. Examples of diamines include ethylene diamine, 1,3-propane diamine, 1,4-butanediamine, 1,5-pentane diamine, hexamethylene diamine, 1,10-decanediamine, cyclohexanediamine, etc. Examples of acids include oxalic, malonic, succinic, glutaric, adipic, pimelic, suberic, azelaic and sebacic acids. The hard or crystalline polyamide segments of the block copolymer can be obtained by polymerization of ω-aminocarboxylic acids containing from 2 to 10 carbon atoms such as aminoacetic acid, 3-aminopropionic acid, 4-aminobutyric acid, 6-aminohexoic acid, 10-aminodecanoic acid, etc. Polymerization of lactams such as ε-caprolactam provides a route to several of such polyamides. Among the preferred polyamides are poly(hexamethylene adipamide) and poly(ε-caprolactam).

The soft, amorphous or low melting segments of the block copolymer contribute wettability, elasticity and rubber character to the copolymer. They can be polyamide or polyether and are advantageously of number average molecular weight in the range of about 300 to about 16,000 and possess a glass transition temperature less than about 50° C. and more preferably in the range of about −50° to about 40° C.

The amorphous polyamide segments can be prepared by condensing an aliphatic or alicyclic diamine having from 2 to 12 carbon atoms with a mixture of an aliphatic or alicyclic dicarboxylic acid having from 4 to 54 carbon atoms and at least 40 weight percent of an aliphatic dicarboxylic acid having from 18 to 54 carbon atoms. The preferred amorphous polyamide segments are prepared by condensing a $C_2$–$C_{10}$ diamine with a dimer acid containing from 75 to 98 weight percent of dimer and more preferably from 90 to 98 weight percent of dimer. Polyether segments are provided by poly(alkyleneoxy)diols such as poly(ethyleneoxy)diols, poly(propyleneoxy)diols and poly(tetramethyleneoxy)diols.

The block copolymers are prepared by a one step or two step method. In the one step method the components which form the hard or soft segments are polymerized in the presence of a prepolymer of the soft or hard segments respectively. In the two step method the hard segments and soft segments are prepared separately as prepolymers and then condensed together.

The melting point and glass transition temperatures are conveniently determined with a duPont differential thermal analyzer Model DTA 900 with the scanning calorimeter attachment, employing a 5 to 25 mg sample heated at a rate of 20° C. per minute, in a nitrogen atmosphere. The melt viscosity of the copolymer determined at a temperature of about 10° C. above the melting point of the copolymer and at a shear rate of 4 sec$^{-1}$ is advantageously in the range of about 1000 to about 3000 poise and is preferably in the range of about 1250 to about 2000 poise.

The most preferred group of block copolymers are block copoly(ester-amides) of the type described in U.S. Pat. No. 3,650,999 especially block copolyesteramides of polyethylene terephthalate or polybutylene terephthalate and a polyamide of an aliphatic primary diamine and dimer acid containing 75 to 98 weight percent dimer and more preferably 90 to 98 weight percent dimer.

In bonding two reinforced plastic parts together to form a bonded structure, one of the primed parts is placed in a fixture adapted to hold it. Molten block copolymer is applied in a suitable pattern. The second primed part is applied against the molten thermoplastic deposited on the first part and a pressure of at least about 20 kPa is applied substantially uniformly over the bond for example by clamping the parts together in the fixture. Preferably the pressure is maintained in the range of about 28 to about 85 kPa until the thermoplastic adhesive has cooled and set. The adhesive bond line is advantageously at least about 200 micron in thickness to accommodate surface unevenness and less than about 1500 micron to provide bonds of adequate strength at high temperatures. Advantageously the primed reinforced plastic parts are heated to at least about 65° C. before the hot melt adhesive block copolymer is applied, and preferably the parts are heated to at least about 105° C. to increase the time that the adhesive remains in a molten bondable state after it has been applied to the reinforced plastic parts. The primed reinforced plastic parts should, however, not be maintained at such elevated temperatures for more than about 2 hours before the bonding step is carried out, to avoid overcure of the primer and adhesive failure of the bond at the primer-adhesive interface. After the bond is made, the bonded structure may be cooled immediately to allow the adhesive to set or it may be subjected to an elevated temperature, for example in the range of 65° to 205° C., preferably 135° to 190° C. for at least about 30 minutes to age the bond and to allow the primer coat to interact with the block copolymer and cure to chemically bond the block copolymer to the reinforced plastic parts. The aging temperature should be at least about 10° C. below the crystalline melting point of the block copolymer. While the molten block copolymer is generally applied from the applicator to just one of the parts to be bonded, higher bond strength can sometimes be obtained by application of the molten adhesive to both parts prior to mating them to form the bond. Bond strengths are determined by AST Method D-1000-72 upon 25 mm square overlaps of test coupons, 25.4×101 mm. The bond is considered to have attained maximum strength if failure occurs in the substrate and not at the bond interface.

The following examples are set forth to illustrate the invention and should not be construed as a limitation thereof. Unless otherwise indicated, all parts and percentages are by weight.

EXAMPLE 1

Coupons (25.4×101×2.72 mm) of reinforced plastic prepared from a polyester sheet molding compound containing 33 weight percent glass fiber and 33 weight percent clay, were wiped with toluene to remove surface contaminants. A 6 weight percent methylene chloride solution of a primer composition comprising 60 parts by weight of an epoxidized novolac resin of epoxy equivalent weight of 175 sold by Dow Chemical Co. under the tradename DEN 431, 30 parts by weight of a resinous amidopolyamine sold by General Mills Inc. under the tradename Versamid 125 and 10 parts by weight of 4,4'-methylene dianiline was applied to the surfaces of the coupons to provide a thin continuous film of dry primer composition.

A block copolyesteramide containing 70 weight percent polyethylene terephthalate and 30 weight percent of a polyamide condensed from 116 parts of hexamethylene diamine and 725 parts of dimer acid containing 97 weight percent dimer, was prepared by condensing with the polyamide a poly ethylene terephthalate of inherent viscosity 0.16 dl g$^{-1}$, determined at 25° C. with a solution of 0.5 g/100 ml in a solvent pair of phenol and symm-tetrachloroethane in the weight ratio of 60:40. The crystalline melting point of the block copolyesteramide was 205° C., the inherent viscosity was 0.56 dl g$^{-1}$ and the melt viscosity at 216° C. and a shear rate of 4 sec.$^{-1}$ was 1180 poise.

The block copolyesteramide was melted in a hot melt applicator and the molten adhesive was applied to a 25.4 mm square of a primed coupon of the reinforced plastic. A second primed coupon was applied to the molten copolyesteramide and clamped to the first coupon under a pressure of 69 kPa for 2 minutes. One hour after the clamp was released, the bond was subjected to a tensile shear test by AST Method D-1000-72. The bond strength was 1380 kPa with adhesive failure at the reinforced plastic interface. Similar bonding tests were carried out under various conditions of preheating of the coupons and aging of the bonds. The results are presented in Table 1. The data show that for maximum bond strength, shown by substrate failure the coupons should be preheated to at least 65° C. and the bonds should be aged at a temperature of at least about 135° C. for about 45 minutes. However when unprimed coupons were bonded under these conditions, the tensile strength of the bond was only 1380 kPa, with adhesive failure of the bond.

When the coupons were primed with an acrylic primer, a phenoxy primer, a methylated melamine, an anaerobic acrylic, a cyanoacrylate or an epoxy polyether, and were heated to 94° C. prior to bonding and aged for 45 minutes at 135° C., tensile strengths in the range of 1000 to 3240 kPa were obtained with adhesive failure of the bond and no substrate failure, showing that these primers were inadequate to provide maximum bond strength to the reinforced plastic structure.

TABLE 1
EFFECT OF BONDING CONDITIONS AND BOND AGING ON BOND STRENGTH

| Bonding Conditions | | | Bond Aging | | Bond Strength | |
|---|---|---|---|---|---|---|
| Surface Temp. °C. | Clamp Pressure kPa | Clamp Time min | Temp. °C. | Time hrs | Tensile kPa | Mode of Failure |
| 22 | 69 | 2 | 22 | 1 | 1380 | Adhesive failure |
| 22 | 69 | 2 | 135 | 0.75 | 2760 | 20-60% substrate failure |
| 22 | 69 | 2 | 176 | 0.75 | 3450 | 30-70% substrate failure |
| 22 | 69 | 2 | 190 | 0.75 | 4200 | 30-70% substrate failure |
| 65 | 69 | 2 | 22 | 0.75 | 3300 | Adhesive failure |
| 65 | 69 | 2 | 135 | 0.75 | 4480 | 100% substrate failure |
| 105 | 69 | 2 | 22 | 1 | 3790 | 30-100% substrate failure |
| 105 | 69 | 2 | 135 | 0.75 | 4960 | 100% substrate failure |
| 105* | 69 | 2 | 135 | 0.75 | 1380 | Adhesive failure |

*unprimed sample

What is claimed is:

1. A process for bonding a first reinforced plastic part to a second reinforced plastic part, which comprises applying a primer coating solution to the bonding surfaces, evaporating solvent from the primer coating to provide a film of dry primer, placing the first reinforced plastic part in a fixture adapted to hold the first-reinforced plastic part, applying a molten thermoplastic adhesive to the primed surface of the first reinforced plastic part, mating the second reinforced plastic part to the first reinforced plastic part to form a bond, retaining the second reinforced plastic part in the fixture against the first reinforced plastic part by application of a pressure of at least 20 kPa substantially uniformly over the bond, and cooling the bonded parts to allow the bond to set, wherein the primer coating comprises an epoxidized novolac resin and a resinous amidopolyamine in a weight ratio in the range of about 2:1 to about 1:2, and wherein the thermoplastic adhesive is a block copolymer comprising 40 to 80 wt % crystalline polyester or polyamide segments and from 20 to 60 wt % amorphous polyamide or polyether segments, and has a crystalline melting point above 155° C. and a number average molecular weight in the range of about 8000 to about 30000.

2. The process of claim 1 wherein the primed reinforced plastic parts are preheated to at least 65° C. before the molten thermoplastic adhesive is applied, wherein the applied pressure is in the range of 28 to 85 kPa and wherein the bond is aged at a temperature in the range of about 65° to about 205° C. for at least about 30 minutes.

3. The process of claim 2 wherein the preheat temperature is at least about 105° C. and the aging temperature is in the range of about 135° to about 190° C.

4. The process of claim 1 wherein the crystalline segments of the block copolymer comprise polyethylene terephthalate or polybutylene terephthalate and the amorphous segments comprise a polyamide condensation product of a dimer acid containing from 75 to 98 weight percent dimer and an aliphatic primary diamine containing from 2 to 10 carbon atoms.

5. The process of claim 1 wherein the epoxidized novolac resin has an epoxy functionality of from 3 to 5 and is the reaction product of epichlorohydrin and a novolac containing from 3 to 6 phenolic hydroxyl groups per molecule and the resinous amidopolyamine is an amine terminated polyamide of amine equivalent weight in the range of about 40 to about 600 prepared by condensation of a $C_2$ to $C_{10}$ primary polyamine and a fatty dicarboxylic acid containing at least 6 carbon atoms, wherein the primer coating thickness is in the range of about 5 to about 25 microns and wherein the thickness of the thermoplastic adhesive bond is in the range of about 200 to about 1500 microns.

6. The process of claim 5 wherein the amine terminated polyamide is a condensate of a $C_2$ to $C_{10}$ primary polyamine and a dimer acid containing from 75 to 98 weight parcent dimer and 25 to 2 weight percent trimer.

7. The process of claim 5 wherein the polyamine component of the primer coat comprises up to 70 weight percent of an aromatic $C_6$ to $C_{20}$ primary polyamine in admixture with the resinous amidopolyamine.

8. The process of claim 1 wherein the crystalline segments of the block copolymer comprise polyethylene terephthalate.

9. The process of claim 2 wherein the epoxidized novolac resin has an epoxy functionality of from 3 to 5 and is the reaction product of epichlorohydrin and a novolac containing from 3 to 6 phenolic hydroxyl groups per molecule and the resinous amidopolyamine is an amine terminated polyamide of amine equivalent weight in the range of about 40 to about 600 prepared by condensation of a $C_2$ to $C_{10}$ primary polyamine and a dimer acid containing from 90 to 98 weight percent dimer and 10 to 2 weight percent trimer, and wherein the crystalline segments of the block copolymer comprise polyethylene terephthalate and the amorphous segments comprise a polyamide condensation product of a dimer acid containing from 90 to 98 weight percent dimer and an aliphatic primary diamine containing from 2 to 10 carbon atoms.

* * * * *

UNITED STATES PATENT AND TRADEMARK OFFICE
CERTIFICATE OF CORRECTION

PATENT NO.  : 4,542,047
DATED       : Sep. 17, 1985
INVENTOR(S) : Donald D. Donermeyer, Joseph G. Martins, David A. Fabel It is certified that error appears in the above-identified patent and that said Letters Patent are hereby corrected as shown below:

In the title:
[54] --A-- Process --for-- Bonded Reinforced Plastic Structures

Col. 1, line 1 --A-- Process --for-- Bonded Reinforced Plastic Structures

Col. 5, line 43 "poly ethylene" --polyethylene--

Signed and Sealed this

Third Day of December 1985

[SEAL]

Attest:

DONALD J. QUIGG

Attesting Officer

Commissioner of Patents and Trademarks